United States Patent
Günzel et al.

(10) Patent No.: US 11,520,025 B2
(45) Date of Patent: Dec. 6, 2022

(54) METHOD FOR CHECKING A DISTANCE MEASURING DEVICE HAVING AN ULTRASONIC SENSOR

(71) Applicant: VOLKSWAGEN AKTIENGESELLSCHAFT, Wolfsburg (DE)

(72) Inventors: Thorben Günzel, Braunschweig (DE); Lynn Brennecke, Braunschweig (DE); Tilo Ernesti, Braunschweig (DE); Norman Hornung, Gifhorn (DE); Jan Brandes, Schwülper (DE)

(73) Assignee: Volkswagen Aktiengesellschaft

( * ) Notice: Subject to any disclaimer, the term of this patent is extended or adjusted under 35 U.S.C. 154(b) by 295 days.

(21) Appl. No.: 16/768,673

(22) PCT Filed: Nov. 30, 2018

(86) PCT No.: PCT/EP2018/083093
§ 371 (c)(1),
(2) Date: May 31, 2020

(87) PCT Pub. No.: WO2019/106131
PCT Pub. Date: Jun. 6, 2019

(65) Prior Publication Data
US 2021/0173063 A1    Jun. 10, 2021

(30) Foreign Application Priority Data
Dec. 1, 2017 (DE) ...................... 10 2017 221 692.1

(51) Int. Cl.
*G01S 7/52* (2006.01)
*G01S 15/931* (2020.01)

(52) U.S. Cl.
CPC ........ *G01S 7/52004* (2013.01); *G01S 15/931* (2013.01); *G01S 2007/52009* (2013.01); *G01S 2015/938* (2013.01)

(58) Field of Classification Search
CPC ............... G01S 7/52004; G01S 15/931; G01S 2007/52009; G01S 2015/938; G01S 7/52;
(Continued)

(56) References Cited

U.S. PATENT DOCUMENTS 6,765,491 B1    7/2004 Nass
8,064,285 B2    11/2011 Preissler
(Continued)

FOREIGN PATENT DOCUMENTS

CN    111556971 A  *  8/2020  ............. G01S 15/10
DE    102005013589 A1    9/2006
(Continued)

OTHER PUBLICATIONS

Search Report for International Patent Application No. PCT/EP2018/083093; dated Feb. 27, 2019.

*Primary Examiner* — Daniel Pihulic
(74) *Attorney, Agent, or Firm* — Barnes & Thornburg, LLP (57) ABSTRACT

A method for checking a distance measuring device of a transportation vehicle wherein the distance measuring device has ultrasonic sensors. A functional impairment of at least one ultrasonic sensor, a check is performed to determine whether one of the ultrasonic sensors is maladjusted, and an often occurring source of a fault causing a functional impairment of ultrasonic sensors is considered.

23 Claims, 5 Drawing Sheets

(58) Field of Classification Search
CPC ..... G01S 2007/52012; G01S 2015/932; G01S 7/52006; G01S 7/521; G01S 7/523; G01S 15/10; G01S 15/87; G01S 15/93; G01S 7/52

See application file for complete search history.

(56) References Cited

U.S. PATENT DOCUMENTS

| | | |
|---|---|---|
| 9,541,642 B2 | 1/2017 | Karl |
| 10,024,955 B2 | 7/2018 | Song et al. |
| 10,094,923 B2 | 10/2018 | Mossau et al. |
| 2002/0047780 A1 | 4/2002 | Nishimoto et al. |
| 2009/0207006 A1 | 8/2009 | Richter et al. |
| 2021/0173063 A1* | 6/2021 | Gunzel .................. G01S 15/10 |

FOREIGN PATENT DOCUMENTS

| | | | |
|---|---|---|---|
| DE | 102005057973 A1 | 6/2007 | |
| DE | 102008022971 A1 | 11/2009 | |
| DE | 102009031561 A1 | 1/2011 | |
| DE | 102010051493 A1 | 7/2011 | |
| DE | 102012200743 A1 | 7/2013 | |
| DE | 102015103542 A1 | 10/2015 | |
| DE | 102015205180 A1 | 9/2016 | |
| DE | 102017221692 A1 * | 6/2019 | ............ G01S 15/10 |
| EP | 1058126 A2 | 12/2000 | |
| EP | 2000822 A1 | 12/2008 | |
| EP | 3717935 A1 * | 10/2020 | ............ G01S 15/10 |
| WO | 2007026211 A1 | 3/2007 | |
| WO | 2015071110 A1 | 5/2015 | |
| WO | WO-2019106131 A1 * | 6/2019 | ............ G01S 15/10 |

* cited by examiner

METHOD FOR CHECKING A DISTANCE MEASURING DEVICE HAVING AN ULTRASONIC SENSOR

PRIORITY CLAIM

This patent application is a U.S. National Phase of International Patent Application No. PCT/EP2018/083093, filed 30 Nov. 2018, which claims priority to German Patent Application No. 10 2017 221 692.1, filed 1 Dec. 2017, the disclosures of which are incorporated herein by reference in their entireties.

SUMMARY

Illustrative embodiments relate to a method for checking a distance measuring device of a transportation vehicle comprising at least one ultrasonic sensor.

BRIEF DESCRIPTION OF THE DRAWINGS

Exemplary embodiments are depicted in the figures and are described in greater detail based on the figures in the subsequent description. Identical reference characters, even in different figures, relate to identical, comparable, or functionally identical components. Corresponding or comparable characteristics are achieved even if a repeated description or reference thereto does not take place. The figures are not always true to scale. In some figures, proportions may be exaggerated to emphasize features of an exemplary embodiment more clearly. In the drawings.

DETAILED DESCRIPTION

Today, almost every transportation vehicle comprises a distance measuring device which is based on ultrasonic sensors. Several ultrasonic sensors are typically installed in both the front bumper cover and in the rear bumper cover of the transportation vehicle. Ultrasonic sensors are also integrated into the front and rear side panel areas.

The distance measuring device acts primarily as a parking assistant when parking in parking spaces, or for generating collision warnings to the driver if distances become too close when maneuvering the transportation vehicle. At the same time, interventions into the steering and braking of the transportation vehicle are also occasionally carried out as a function of the sensor data.

It goes without saying that proper functioning of the ultrasonic sensors must be ensured for the distance measuring device of the transportation vehicle and systems which are dependent thereon to be able to operate correctly, and for the driver to be able to rely on corresponding warning signals.

The functionality of distance measuring devices based on ultrasound is sufficiently known from the prior art and therefore does not need to be described within the scope of the present disclosure.

DE 10 2005 013 589 A1 discloses a method for checking the function of a distance measuring device comprising at least two ultrasonic sensors having the features of the preamble of patent claim 1. Specifically, a signal transmitted by a second ultrasonic sensor of the distance measuring device is routed to the first ultrasonic sensor without reflection off an external obstacle. Functioning of the first sensor is determined by the second sensor receiving the signal transmitted via the first sensor. However, correct reception of the signal transmitted by the second sensor is determined only if the signal amplitude of the signal exceeds an application-dependent, determinable threshold value in the case of a plurality of successive measurements. Otherwise, a warning is issued to a driver about a functional impairment of the first sensor. Under this approach, the crosstalk signals between two adjacent sensors which are caused by structure-borne sound are thus evaluated for the purpose of a functional check, wherein by the threshold value, in particular, gradual blindness of an ultrasonic sensor, for example, due to icing, contamination, or aging, is to be detected.

In addition, EP 1 058 126 B1, which also comprises the features of the preamble of patent claim 1, is concerned with the problem of gradual blindness of a distance measuring device in the bumper of a transportation vehicle due to snow, ice, dirt, and the like. The document also makes use of the crosstalk signals of adjacent ultrasonic sensors caused by structure-borne sound for detecting contamination. If the intensity of a crosstalk signal which is transmitted by a first ultrasonic sensor and which is received by a second, adjacent ultrasonic sensor exceeds a particular threshold value, a functional impairment of the first ultrasonic sensor is established via a noise determination device, and a visual or acoustic warning signal is issued to a user.

The disclosed embodiments provide a method for checking a distance measuring device of a transportation vehicle, the device comprising at least one ultrasonic sensor, and the method providing an alternative approach for performing a functional check of a distance measuring device. In addition, the disclosed embodiments provide a suitable transportation vehicle for carrying out the method.

This is achieved by the disclosed method and the disclosed transportation vehicle.

The disclosed embodiments are directed to a method for checking a distance measuring device of a transportation vehicle, the device comprising at least one ultrasonic sensor, and the method detecting a functional impairment of the ultrasonic sensor.

The disclosed embodiments propose checking whether there is a misalignment of the ultrasonic sensor. The disclosed embodiments thus follow a completely different approach than the known prior art, which aims merely to take actions against gradual degradation of a distance measuring device caused by contamination.

By checking for signs of misalignment, another significant and frequently occurring source of error of a distance measuring device may thus be identified. A misalignment of an ultrasonic sensor may be triggered for various reasons:

the sensor holder including the ultrasonic sensor falling off the bumper due to insufficient adhesion the ultrasonic sensor falling out of the sensor holder external application of force, for example, due to deformation of the bumper as a result of minor damage while parking due to production tolerances.

A misalignment of the ultrasonic sensor may result in its range decreasing significantly or erroneous distances being output.

According to a first refinement of the method, it is provided that, in the case of known misalignment of the at least one ultrasonic sensor, an optical and/or acoustic indication is issued to the driver, and/or previously determined functions are automatically deactivated. The previously determined functions are such functions which are based on the distance information of the at least one ultrasonic sensor which is detected as being misaligned. This applies to functions which intervene into the steering and/or braking of the transportation vehicle. By this exemplary embodiment of the disclosed method, a high degree of safety may thus be achieved in the case of a functional impairment of an ultrasonic sensor.

According to another refinement of the method, it is provided that it is measured whether the ultrasonic sensor continuously measures a distance in a near range, or whether the ultrasonic sensor measures distances in the near range which vary (fluctuate) markedly over time. If one of these conditions is affirmed, a misalignment of the ultrasonic sensor is inferred. The near range may be defined, for example, as distances under 30 cm.

This exemplary embodiment of the disclosed method is highly suitable for detecting the misalignment features which indicate that the ultrasonic sensor has fallen out of its sensor holder, or that the sensor holder including the ultrasonic sensor has fallen off.

In such cases, the ultrasonic sensor measures very close distances to an underlying surface, to components of the transportation vehicle, and/or to the inside of the bumper. In addition, the ultrasonic sensor dangles on its connection cable and as a result, moves constantly when starting, braking, and during the normal driving motion of the transportation vehicle. The measured distances no longer exceed a certain distance value and fluctuate markedly.

However, it is conceivable that markedly fluctuating measured values also occur due to intense external noise sources. For this purpose, filter mechanisms are known which check whether such an external malfunction exists, in which all ultrasonic sensors of a bumper are typically affected.

In this case, it must be accepted that a check for misalignment using the aforementioned method is temporarily not possible. A message about the temporary malfunction may then be issued to the driver.

Another exemplary embodiment of the disclosed method provides that it is measured whether a structure-borne sound signal from the ultrasonic sensor to be checked is received by at least one ultrasonic sensor which is directly adjacent to the ultrasonic sensor to be checked. If the answer to this condition is negative, a misalignment of the ultrasonic sensor to be checked is also inferred.

This exemplary embodiment of the disclosed method thus makes use of the property that an ultrasonic transmission signal (transmission pulse) of an ultrasonic sensor is also transmitted via the bumper to the directly adjacent ultrasonic sensors by structure-borne sound.

If signals from an ultrasonic sensor to be checked are no longer received by the adjacent ultrasonic sensors by structure-borne sound, this may be used as a symptom of misalignment of the ultrasonic sensor to be checked.

However, the informative value of this exemplary embodiment of the disclosed method may be limited if ultrasonic sensors are covered with ice or snow. This also results in a signal no longer being transmitted via structure-borne sound.

For this purpose, according to a refinement, it is provided that, for determining an existing misalignment of the ultrasonic sensor when a structure-borne sound signal is absent, the external temperature is measured, and in the case of an external temperature around the freezing point, at least one sensor-specific parameter of the ultrasonic sensor is measured. In the case of a deviation of the sensor-specific parameter from a standard value, a temporary malfunction of the ultrasonic sensor caused by snow or ice is inferred.

For example, the decay time of the ultrasonic sensor may be checked as a sensor-specific parameter. In the case of a blocked state of the ultrasonic sensor by ice or snow, the decay time differs significantly from the average decay time.

In the case of such a malfunction caused by snow or ice, reliable misalignment detection is thus not possible, and the indication of a temporary malfunction caused by snow or ice may be provided as a warning to the driver.

Another exemplary embodiment of the disclosed method provides that, when approaching an object, it is checked whether the object is detected via several ultrasonic sensors of a group of ultrasonic sensors. If this condition is affirmed, it is checked whether the object is not detected via an ultrasonic sensor of the group. If the latter condition is affirmed, it is inferred that there is a misalignment of the ultrasonic sensor from the group via which the object was not detected.

This exemplary embodiment of the disclosed method is suitable for identifying a sensor misalignment if the ultrasonic sensor is still installed in the sensor holder and the sensor holder is still attached to the bumper. This may, for example, occur due to a deformation of the bumper as a result of an accident or minor damage while parking.

The echo image of adjacent ultrasonic sensors is thus evaluated when approaching an object in the transportation vehicle surroundings. An object having a marked surface extent (for example, a transportation vehicle) is typically detected by several ultrasonic sensors simultaneously. By evaluating the echo images of adjacent ultrasonic sensors, a misaligned ultrasonic sensor may thus be detected. However, the detection is also a function of the position-specific sensitivity of an ultrasonic sensor with respect to the object.

Therefore, one refinement of the method also provides that, in this case, it can be inferred that there is a misalignment of the ultrasonic sensor not detecting the object only if the ultrasonic sensor is installed between two other ultrasonic sensors from the group, and the detection areas of the ultrasonic sensors overlap. Thus, if the group is, for example, made up of three adjacent ultrasonic sensors, of which the two outer ultrasonic sensors detect an object, but the center ultrasonic sensor does not, it may be assumed with fairly high certainty that there is a misalignment of the center ultrasonic sensor.

In this case, it is assumed that a general functional check has previously confirmed existing functionality of the ultrasonic sensor. Thus, there cannot be a total failure of the ultrasonic sensor. In other words, the ultrasonic sensor is still capable of transmitting ultrasonic transmission signals and receiving echo signals. This condition also applies to the previously mentioned methods for detecting misalignment.

Another refinement of the method, which is also particularly suitable for detecting the aforementioned case of misalignment, consists of producing a reference echo image of the underlying surface surrounding the transportation vehicle via the ultrasonic sensor, when switching off the ignition (i.e., before parking the transportation vehicle). After switching on the ignition again, or after opening the transportation vehicle, another echo image of the underlying surface surrounding the transportation vehicle is produced. The echo image is compared to the reference echo image. If there is a difference between the echo images, it is inferred that there is a misalignment of the ultrasonic sensor.

For example, it is conceivable that the reference echo image shows a measured distance from the underlying surface of 70 centimeters, whereas after switching on the ignition again or after opening the transportation vehicle, it is no longer possible to receive any echoes from the underlying surface. Conversely, it is conceivable that the reference echo image discloses a distance of approximately 70 centimeters from the ground, but the echo image produced after ignition shows a reduced distance from the ground, for example, a distance of 40 centimeters.

However, in this case, situations are also conceivable in which this exemplary embodiment of the disclosed method is applicable only to a limited extent. Thus, for example, the underlying surface may change between the time of parking the transportation vehicle and restarting the transportation vehicle, due to the weather, for example, as a result of a heavy snowfall. In this case, it is also conceivable to detect whether or not snowfall has occurred via a camera system. If this is the case, such an exemplary embodiment of the disclosed method may be electronically deactivated.

However, it also cannot be entirely ruled out that a misalignment occurred during the production of a transportation vehicle in the factory.

To be able to rule out "subsequent errors" caused thereby, according to another exemplary embodiment of the disclosed method, it is provided to produce an echo image of the flat underlying factory surface surrounding the transportation vehicle, after assembling the transportation vehicle in the production factory. The echo image is then compared to an initial echo image which is to be expected according to the vehicle-specific application of the ultrasonic sensor in the case of a flat underlying surface. In the case of a difference in the echo images which exceeds the tolerance, it is inferred that there is a misalignment of the ultrasonic sensor which is caused by the assembly. The misaligned ultrasonic sensor may then be replaced in the factory and recalibrated.

However, when creating the echo images of the underlying surface only echo signals from objects which are classified as low are used. Echo signals from objects which are classified as tall do not originate from the underlying surface or floor and may possibly change dynamically. An object classified as tall may, for example, be an adjacent, parking transportation vehicle which has driven away again in the meantime. Flatter objects are also conceivable, for example, a box, which was present when the transportation vehicle was parked, but which was removed before subsequently starting the transportation vehicle.

If it is determined via one of the previously described embodiments of the disclosed method that a misalignment of the ultrasonic sensor exists, then, as already mentioned, in addition to a corresponding warning to the driver, functions which operate on the basis of the misaligned ultrasonic sensor may also be deactivated or at least reduced.

Such a function may then, for example, be an intervention into the steering or braking of the transportation vehicle, for example, to assist the driver when parking in parking spaces, or to prevent or minimize a collision by an emergency braking intervention.

Finally, according to an additional, highly beneficial refinement of the method, it is provided that, after switching on the ignition or after opening the transportation vehicle, it is cyclically checked whether a check of the ultrasonic sensor for misalignment according to one of the previously described embodiments of the disclosed method was duly possible. After exceeding a certain period of time or a certain distance after switching on the ignition or after opening the transportation vehicle, after which such a proper check of the ultrasonic sensor was not possible, an evaluation takes place of stored values of acceleration sensors of the transportation vehicle. The evaluation takes place as to whether a crash or a manipulation of the transportation vehicle (for example, a theft attempt) has taken place. The acceleration sensors may, for example, be pre-crash sensors or sensors of a theft warning system.

If a crash or a manipulation of the transportation vehicle has apparently taken place, it is inferred that there is a misalignment of the ultrasonic sensor caused by a crash or manipulation. An optical and/or acoustic warning is issued. Functions which operate on the basis of signals of the misaligned ultrasonic sensor are deactivated, or their scope of function is at least reduced.

In another exemplary embodiment of the disclosed method, before determining an existing misalignment of the ultrasonic sensor, at least one sensor-specific parameter of the ultrasonic sensor is measured. In the case of a deviation of the sensor-specific parameter from a standard value, it is inferred that there is a malfunction of the ultrasonic sensor due to noise. Here, the characteristic of ultrasonic sensors may be used in which their sensor-specific values (for example, oscillation amplitude, echoes, decay time, propagation time, power, etc.) change significantly under the influence of a noise source.

As already mentioned, via the present disclosure, a transportation vehicle for carrying out the disclosed method is also to be placed under protection.

Such a transportation vehicle is equipped with a distance measuring device comprising several ultrasonic sensors. Furthermore, the transportation vehicle comprises at least one external temperature probe, several acceleration sensors for detecting a crash and/or a manipulation of a transportation vehicle, and at least one memory unit for storing data of the acceleration sensors and/or for storing echo images of the ultrasonic sensors. Furthermore, there is at least one time or displacement sensor for outputting an elapsed time or displacement value since switching on the ignition or since opening the transportation vehicle. Likewise, there is at least one comparison unit for comparing created and stored echo images and/or for comparing the time or displacement value with a stored threshold value. The comparison unit may also be used for comparing the stored acceleration values with threshold values which indicate a crash or a manipulation of the transportation vehicle. In addition, there is at least one optical and/or acoustic output unit for issuing warning messages. Finally, the transportation vehicle comprises at least one evaluation and control unit for evaluating signals of the ultrasonic sensors, for actuating the optical and/or acoustic output unit, and for actuating components which operate on the basis of signals of the ultrasonic sensors.

The evaluation and control device can actuate the ultrasonic sensors, the acceleration sensors, the memory unit, the time or displacement sensor, the comparison unit, the aforementioned components, and the optical and/or acoustic output unit in such a way that the disclosed method can be carried out, and a misalignment of ultrasonic sensors can be determined.

In the case of a determined misalignment of at least one of the ultrasonic sensors, components which operate on the basis of signals of the misaligned ultrasonic sensor can be actuated, or are actuated, by the evaluation and control device in such a way that their function is deactivated or at least their functional scope is reduced.

For example, it is conceivable that, in the case of a misalignment of an ultrasonic sensor relating to a parking assistant or a parking steering assistant, the evaluation and control device reduces functions of the parking assistant or the parking steering assistant and, for example, no longer allows an intervention into the steering of the transportation vehicle via the parking steering assistant.

Figure 1:
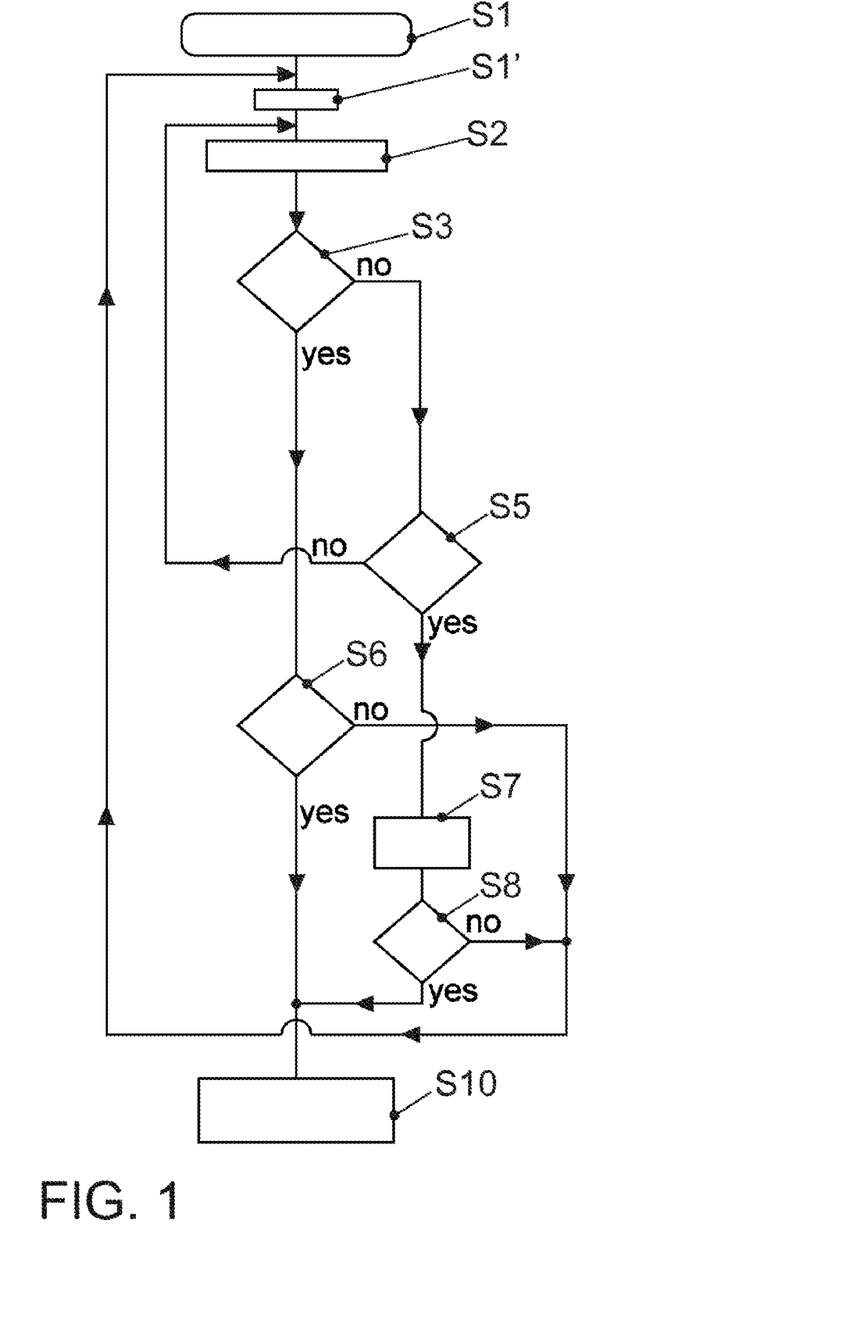
FIG. 1 depicts a flow chart for describing the disclosed method.

Reference will initially be made to FIG. 1. This figure depicts a flow chart which describes the disclosed method in greater detail. Thus, in a method operation at S1, the switching on of the ignition of a transportation vehicle takes place. In a method operation at S1', a time or displacement sensor is started.

In a second method operation at S2, a misalignment check of existing ultrasonic sensors takes place according to previously described methods.

In a method operation at S3, it is queried whether a proper misalignment check was possible since starting the ignition or since opening the transportation vehicle, using one of the methods.

If this is the case, in a method operation at S6, it is queried whether a misalignment was reliably detected in the misalignment check according to method operation at S2. If this is the case, in a method operation at S10, an acoustic and/or optical warning is issued to the driver. The warning indicates that the misalignment of an ultrasonic sensor has been determined, and proper functioning is therefore no longer possible. Functions and components which operate on the basis of signals of the misaligned ultrasonic sensor are actuated in such a way that their function is deactivated, or at least their function scope is reduced. A message to this effect is also issued to the driver.

However, if it is determined in method operation at S6 that no misalignment could be determined during the misalignment check, a misalignment check takes place again in method operation at S2.

If it was detected in method operation at S3 that a proper misalignment check according one of the methods in method operation at S2 was not possible since starting the ignition or since opening the transportation vehicle, or since starting the time or displacement sensor, then, in a method operation at S5, it is queried whether a particular threshold value of the started time or displacement counter (compare method operation at S1') has been reached. If this has not yet occurred, a cyclical repetition of the misalignment check according to method operation at S2 takes place.

However, if it is determined in method operation at S5 that a particular threshold value of the time or displacement counter has been reached, then, in a method operation at S7, the evaluation takes place of data of acceleration sensors of the transportation vehicle. The evaluation takes place of such acceleration sensors which are able to store data about a crash or an unauthorized attempt at manipulation. Such acceleration sensors may, for example, be sensors of a restraint system (for example, airbag) or a theft warning system.

In a method operation at S8, it is queried whether a crash or a manipulation was detected based on the values of the acceleration sensors. If this is the case, it is also assumed that a misalignment of ultrasonic sensors has occurred due to the crash or the manipulation, and a corresponding warning is in turn issued according to method operation at S10, connected with a deactivation or at least a reduction of the affected functions.

If, however, in method operation at S8, neither a crash nor a manipulation is to be detected, then, in method operation at S1', a reset and a restart of the time or displacement counter is carried out. Subsequently, a new misalignment check takes place in method operation at S2 via the available methods.

If it was determined in method operation at S6 that a misalignment was not detected by any methods for checking misalignment carried out in method operation at S2, then the method likewise returns from method operation at S6 directly back to method operation at S1', whereby the described method is carried out again.

As a result of the fact that in method operation at S2, the misalignment check is carried out not only via a method, but via several methods, the possibility of detecting a misalignment of an ultrasonic sensor is significantly increased. In addition, a probability of detecting misaligned sensors is still increased via method operation at S7, in that, so to speak, yet more data sources are tapped which may indicate a misalignment.

Figure 2:
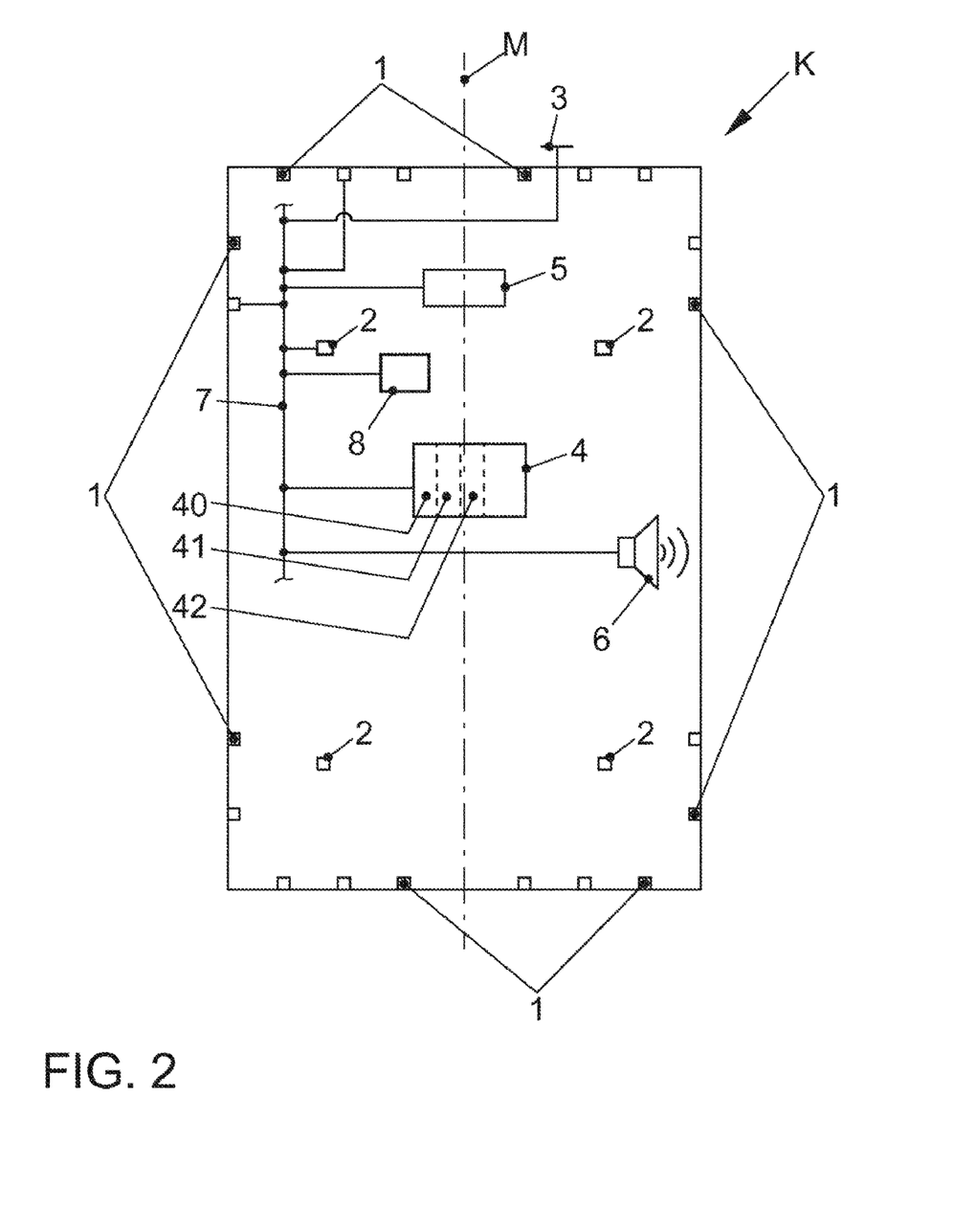
FIG. 2 depicts a transportation vehicle for carrying out the disclosed method.

FIG. 2 depicts a transportation vehicle K which is arranged for carrying out the disclosed method.

The transportation vehicle K is thus equipped with a distance measuring device which comprises a plurality of ultrasonic sensors 1. A longitudinal central plane of the transportation vehicle K is indicated by M.

It is apparent that the ultrasonic sensors 1 are arranged on the front and on the rear of the transportation vehicle K, respectively to the left and the right of the longitudinal center plane M. In addition, ultrasonic sensors 1 are also arranged on the sides of the transportation vehicle K, respectively in the front area and in the rear area.

The transportation vehicle K also comprises several acceleration sensors 2 which are able to detect longitudinal, transverse, and yaw accelerations. The acceleration sensors 2 belong to a restraint system which is not depicted in greater detail, and a theft warning system which is likewise not depicted in greater detail.

A temperature sensor 3 is used to detect the external temperature.

Furthermore, the transportation vehicle K comprises a display and operating device 5 which thus also functions as an optical output unit and which may be configured as a touchscreen. An acoustic signaling device 6 is used for outputting acoustic warning signals, for example, during a parking operation.

Finally, the transportation vehicle K comprises an evaluation and control device 4. The evaluation and control device 4 is connected via a data bus 7 to the aforementioned components of the transportation vehicle, using data and control technology.

For the sake of clarity, by way of example, only a few of the ultrasonic sensors 1 and the acceleration sensors 2 are connected to the data bus 7. The data bus 7 may be configured as a CAN or LIN bus.

The evaluation and control device 4 is capable of querying and evaluating data of the aforementioned components and actuating these components in such a way that the various methods for detecting the misalignment of one or several of the ultrasonic sensors 1 can be carried out, and the described method is able to be carried out. For this purpose, the evaluation and control device 4 also comprises a memory unit 40 in which data of the acceleration sensors 2 and echo images of the ultrasonic sensors 1 can be stored. A time or displacement sensor 41 is used to increment time or displacement values after starting a transportation vehicle.

Stored echo images of the ultrasonic sensors 1 may be compared with one another in a comparison unit 42. The comparison unit 42 is also used for comparing actual values with particular or determinable threshold values. For example, a comparison of an instantaneous time or displacement value with a stored threshold value takes place in the comparison unit 42. In the comparison unit 42, a comparison of stored values of the acceleration sensors 2 with acceleration values may take place, which indicates that a crash or manipulation of the transportation vehicle has taken place.

If the misalignment of one of the ultrasonic sensors 1 is determined, then, based on the data evaluated by the evaluation and control device 4, an actuation of the display and operating device 5 and/or the acoustical signal device 6 takes place to the effect that an optical and/or acoustical warning is issued to the driver. In addition, functions of such components of the transportation vehicle K are deactivated, or at least the functional scope is reduced of those components which operate based on the data of the misaligned ultrasonic sensor 1. A message about this is also provided to the driver.

By way of example, a parking assistance system 8 is depicted, which is used for actively supporting a parking operation. In this case, the parking assistance system 8 intervenes actively into the steering of the transportation vehicle. At this point, if one ultrasonic sensor 1 is misaligned, or even several ultrasonic sensors 1 are misaligned, the data of which the parking assistance system 8 accesses, then the function of the parking assistance system 8 is also deactivated by the evaluation and control device 4. The functional scope of the parking assistance system 8 is at least reduced such that an intervention into the steering no longer takes place.

A reactivation of deactivated or reduced functional scopes may take place exclusively in a workshop using suitable diagnostic tools, after misaligned ultrasonic sensors 1 have again been properly repaired.

A conceivable method for determining a misalignment will now be described in greater detail based on the FIG. 3.

Figure 3A:
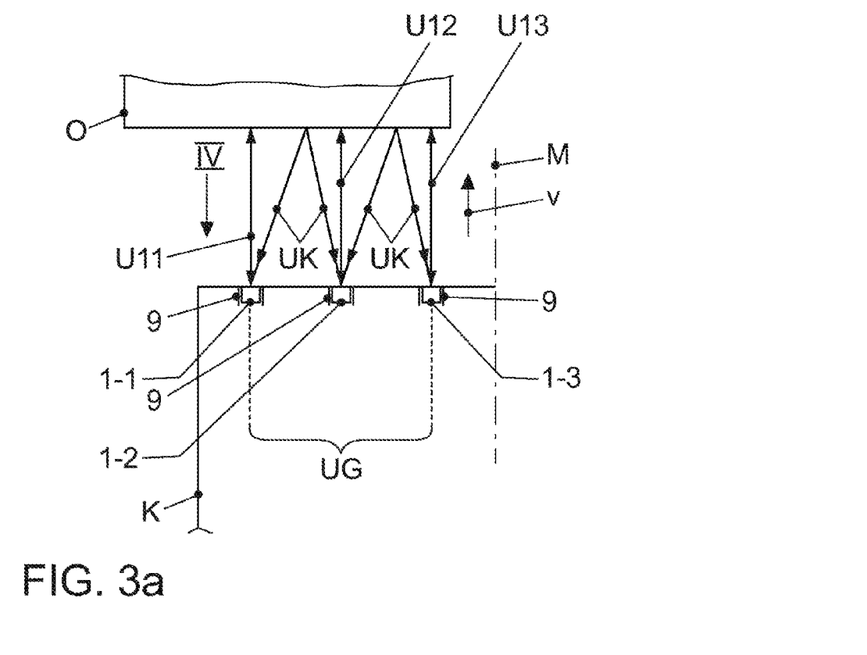
FIGS. 3a-b depict the description of an exemplary embodiment of the disclosed method.

FIG. 3a depicts a proper state of the transportation vehicle K in the left front-end area. Three ultrasonic sensors 1-1, 1-2, and 1-3 are apparent, which form a group UG of ultrasonic sensors. Sensor holders for the ultrasonic sensors are indicated by the number 9. The detection areas of the ultrasonic sensors 1-1, 1-2, and 1-3 overlap one another.

The transportation vehicle K travels at a low speed v in the direction of a stationary object O. The object features a particular surface extent and may, for example, be the bumper of another parking transportation vehicle.

Each of the ultrasonic sensors 1-1 to 1-3 transmits an ultrasonic transmission signal and receives an ultrasonic direct echo U11, U12, and U13 which is reflected by the object O. In addition, so-called ultrasonic cross-echoes UK occur between directly adjacent ultrasonic sensors, i.e., between the ultrasonic sensors 1-1 and 1-2 or the ultrasonic sensors 1-2 and 1-3.

In the depicted proper state, all three ultrasonic sensors 1-1 to 1-3 thus generate echo images which detect the object O and which can be evaluated by the evaluation and control device 4.

If there is a misalignment, for example, of the center ultrasonic sensor 1-2 from the group UG (compare FIG. 3b), the object O is detected only via the ultrasonic sensors 1-1 and 1-3. These ultrasonic sensors receive ultrasonic direct echoes U11 and U13.

Figure 3B:
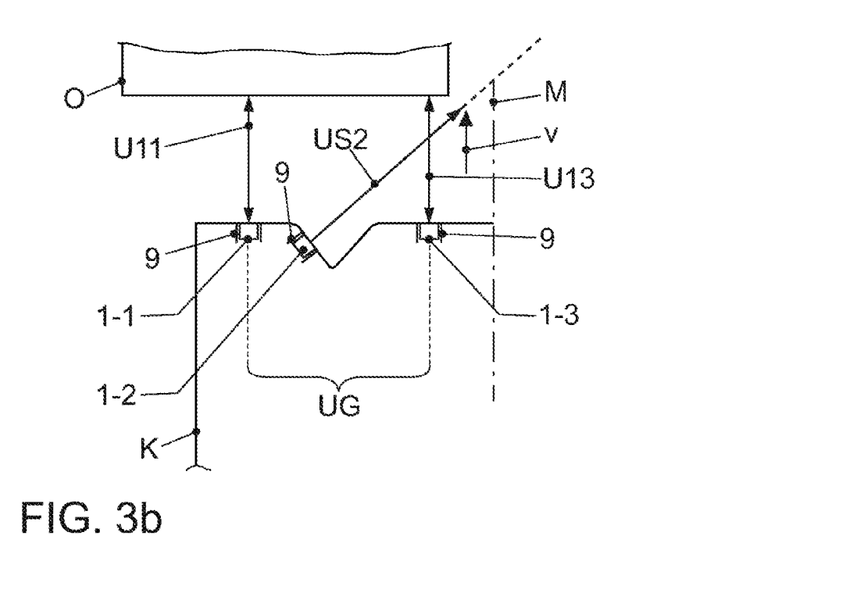

It is apparent that in FIG. 3b, a deformation of the front end of the transportation vehicle K has taken place in the area of the ultrasonic sensor 1-2. The reason may, for example, be minor damage while parking, from a parked transportation vehicle. Although the ultrasonic sensor 1-2 is still in its sensor holder 9, the ultrasonic sensor 1-2, including the holder, is misaligned. An ultrasound transmission signal US2 which is transmitted by the ultrasonic sensor 1-2 passes by the object O and dissipates. After evaluating the stored echo images of the ultrasonic sensors 1-1 to 1-3, the evaluation and control device 4 determines that the object O was detected by several ultrasonic sensors of the group UG, but not by the ultrasonic sensor 1-2 which is installed or arranged between the ultrasonic sensors 1-1 and 1-3. The evaluation and control device 4 thereby infers a misalignment of the central ultrasonic sensor 1-2 and issues a corresponding warning to the driver. Simultaneously, there is a functional reduction or deactivation of functions which operate on the basis of data of the ultrasonic sensor 1-2 or the group UG.

Figure 4A:
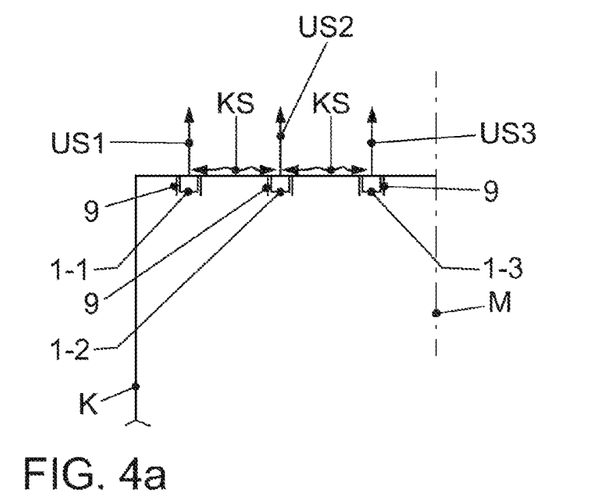
FIGS. 4a-b depict the description of another exemplary embodiment of the disclosed method.
Figure 4B:
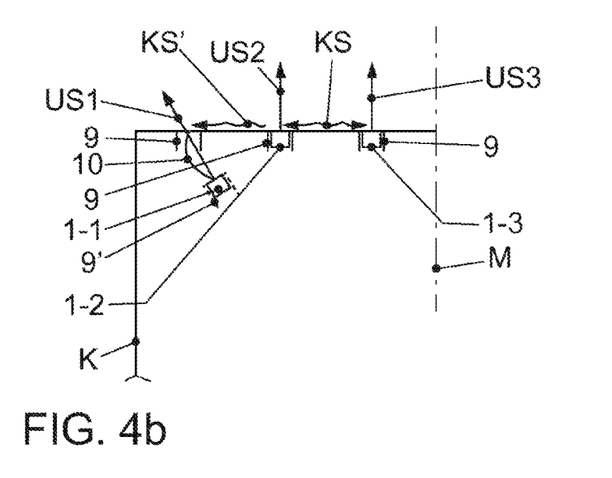

The FIG. 4 show another possible method for detecting misalignment. In these figures, the same front section of the front-end area of the transportation vehicle K is depicted.

If the alignment is correct, the ultrasonic sensors 1-1 to 1-3 respectively transmit ultrasonic transmission signals US1, US2, and US3. Due to the transmitted ultrasonic transmission signals (transmission pulses), the transmission of structure-borne sound KS (crosstalk signal) also occurs simultaneously between respectively adjacent ultrasonic sensors 1-1 and 1-2, and 1-2 and 1-3.

If there is a misalignment of an ultrasonic sensor, for example, of the ultrasonic sensor 1-1, such that the sensor has fallen out of its sensor holder 9 or has fallen out along with this holder (compare 9'), and is merely hanging on its connection cable 10, then the ultrasonic sensor 1-1 transmits an ultrasonic transmission signal US1, but structure-borne sound KS is no longer emitted by this ultrasonic sensor 1-1.

In other words, the directly adjacent ultrasonic sensor 1-2 can no longer receive such structure-borne sound KS from the misaligned ultrasonic sensor 1-1. The ultrasonic sensor 1-2 transmits only unilateral structure-borne sound KS' in the direction of the original mounting position of the ultrasonic sensor 1-1.

If the evaluation and control device 4 determines, by corresponding evaluation logic, that the ultrasonic sensor 1-2 no longer receives a structure-borne sound signal KS from the ultrasonic sensor 1-1, despite the functional capability of the ultrasonic sensor 1-1, then the evaluation and control device 4 infers a misalignment of the ultrasonic sensor 1-1.

In turn, corresponding operations, such as issuing messages and deactivating/reducing affected functions, are introduced.

Figure 5:
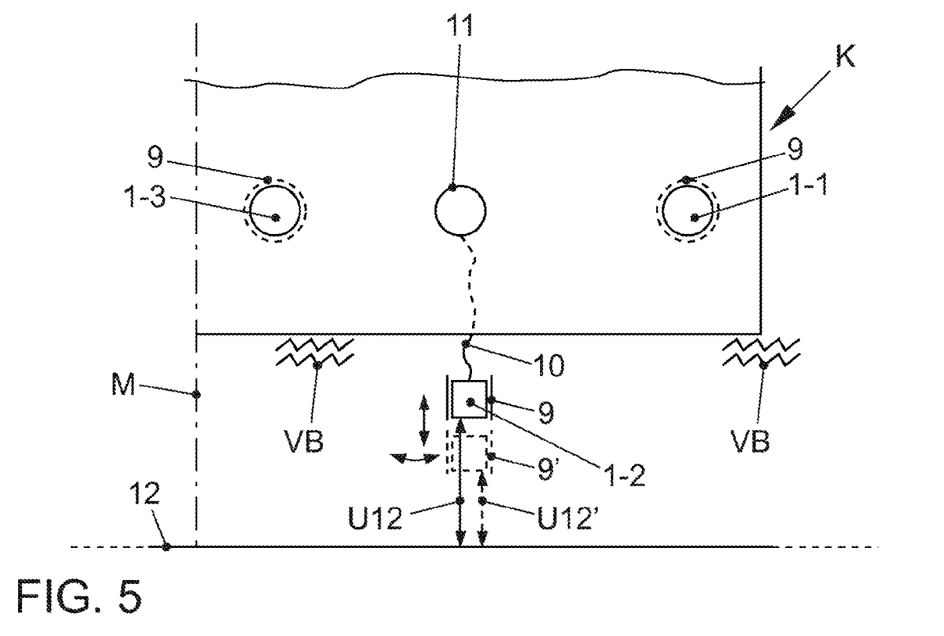
FIG. 5 depicts the description of yet another exemplary embodiment of the disclosed method.

Finally, another option for checking a misalignment is described in FIG. 5.

In this case, a section of the transportation vehicle K is depicted from an angle of view V of FIG. 3A.

Specifically, the ultrasonic sensor 1-2, along with its sensor holder 9, has fallen out it is installation opening 11. The ultrasonic sensor 1-2 is still merely hanging loose on its connection cable 10.

Due to vibrations VB of the transportation vehicle K occurring during travel, the ultrasonic sensor 1-2 makes marked vertical and swinging movements (compare double arrows). This results, for example, in ultrasonic direct echoes U12 and U12' which are highly variable (fluctuating) over time being measured by the ultrasonic sensor 1-2, which originate from an adjacent object in the near range of a few centimeters. The object may, for example, be an underlying surface 12, to which the ultrasonic sensor 1-2 which has fallen out is now much closer. It is also conceivable that the nearby object is the front bumper or another component of the transportation vehicle K itself, behind which the misaligned ultrasonic sensor 1-2 is now situated.

However, in connection with FIG. 4, it may occur that one of the ultrasonic sensors 1-1 to 1-3 is covered with ice or snow. This results in structure-borne sound KS no longer being transmitted, or at least no longer being transmitted at a sufficient signal strength, to the adjacent ultrasonic sensor by the relevant ultrasonic sensor. In this case, it is conceivable that the evaluation and control device 4 measures a sensor-specific parameter, for example, the decay time of the affected ultrasonic sensor. If the decay time is markedly reduced with respect to the normal value, it may be inferred that the sensor is merely in a blocked state due to ice or snow and is not misaligned at all. Here as well, a corresponding message may be provided to the driver that the functionality of the ultrasonic sensors is at least temporarily impaired. The same applies if a temporary functional impairment of the ultrasonic sensors exists due to heavy ultrasonic sensor interference in the immediate surroundings of the transportation vehicle.

LIST OF REFERENCE CHARACTERS

1 Ultrasonic sensors
1-1 First ultrasonic sensor
1-2 Second ultrasonic sensor
1-3 Third ultrasonic sensor
2 Acceleration sensors
3 Temperature sensor
4 Evaluation and control device
5 Display and operating device; optical output unit
6 Acoustic signal device, acoustic output unit
7 Data bus (CAN)
8 Parking assistance system
9, 9' Sensor holder
10 Connection cable
11 Installation opening
12 Underlying surface
40 Memory unit
41 Time or displacement sensor
42 Comparison unit
K Transportation vehicle
KS, KS' Structure-borne sound (crosstalk signal)
M Longitudinal center plane
O Object
S1 to S10 Method operations
S1' Method operation
S9 Method operation
UG Group of ultrasonic sensors
U11 to U13 Ultrasonic direct echoes
UK Ultrasonic cross-echoes
US1 to US3 Ultrasonic transmission signals
VB Vibrations
v Speed

The invention claimed is:

1. A method for checking a distance measuring device of a transportation vehicle, the device including at least one ultrasonic sensor, at least one acceleration sensor, at least one memory unit, at least one time or displacement sensor, at least one comparison unit, at least one optical and/or acoustic output unit and at least one evaluation and control device, the method comprising:
detecting a functional impairment of the at least one ultrasonic sensor to check whether a misalignment of the at least one ultrasonic sensor exists by the at least one evaluation and control device actuating the at least one ultrasonic sensor, the at least one acceleration sensors, the at least one memory unit, the at least one time or displacement sensor, the at least one comparison unit, and the at least one optical and/or acoustic output unit, to determine a misalignment of at least one ultrasonic sensor; and
in response to a detected misalignment of at least ultrasonic sensor by the evaluation and control device, an optical and/or acoustic warning is issued, and components which operate based on signals of the misaligned ultrasonic sensor are actuated such that their function is deactivated or at least their functional scope is reduced.

2. The method of claim 1, wherein an optical and/or acoustic indication is issued to the driver, and/or previously determined functions are automatically deactivated in response to a detected misalignment of the at least one ultrasonic sensor.

3. The method of claim 1, wherein the method measures whether the ultrasonic sensor continuously measures a distance in a near range, or measures distances in the near range which are highly variable over time, and in response to one of these conditions being affirmative, a misalignment of the ultrasonic sensor is inferred.

4. The method of claim 1, wherein the method continuously measures whether a structure-borne sound signal from the ultrasonic sensor to be checked is received by at least one ultrasonic sensor which is directly adjacent to the ultrasonic sensor to be checked, and in response to this condition being negative, a misalignment of the ultrasonic sensor to be checked is inferred.

5. The method of claim 1, wherein the external temperature is measured before determining an existing misalignment of the ultrasonic sensor, and in response to an external temperature being around the freezing point, at least one sensor-specific parameter of the ultrasonic sensor is measured, wherein in response to a deviation of the sensor-specific parameter from a standard value, a malfunction of the ultrasonic sensor caused by snow or ice is inferred.

6. The method of claim 1, wherein, when approaching an object, it is checked whether the object is detected by several ultrasonic sensors of a group of ultrasonic sensors, and in response to this condition being affirmative, it is checked whether the object is not detected by an ultrasonic sensor of the group, wherein in response to this condition being affirmative, it is inferred that there is a misalignment of that ultrasonic sensor from the group which did not detect the object.

7. The method of claim 6, wherein a misalignment of the ultrasonic sensor not detecting the object is inferred only in response to the ultrasonic sensor being installed between two other ultrasonic sensors from the group, and the detection areas of the ultrasonic sensors overlap.

8. The method of claim 1, wherein a reference echo image of the underlying surface surrounding the transportation vehicle is produced by the ultrasonic sensor when shutting off the ignition, wherein, a further echo image of the underlying surface surrounding the transportation vehicle is produced after restarting the ignition or after opening the transportation vehicle, and the echo image is compared with the reference echo image, wherein a misalignment of the ultrasonic sensor is inferred in response to a difference between the echo images.

9. The method of claim 1, wherein an echo image of the factory underlying surface surrounding the transportation vehicle is produced after assembling the transportation vehicle in the production plant, wherein the echo image is compared with the initial echo image which is to be expected in the case of a flat underlying surface, according to the vehicle-specific application of the ultrasonic sensor, and wherein a misalignment of the ultrasonic sensor which is caused by the installation is inferred in response to a difference between the echo images which exceeds the tolerance.

10. The method of claim 8, wherein only echo signals of objects which are classified as low are taken into consideration for producing the echo images of the underlying surface surrounding the transportation vehicle.

11. The method of claim 1, wherein the method further comprises cyclically checking whether the ultrasonic sensor for misalignment was possible after switching on the ignition or after opening the transportation vehicle, wherein after exceeding a certain period of time or a certain distance after switching on the ignition, after which such a proper check of the ultrasonic sensor was not possible, an evaluation of stored values of acceleration sensors of the transportation vehicle takes place as to whether a crash or a manipulation of the transportation vehicle has taken place, wherein a misalignment which is caused by a crash or manipulation is inferred in response to one of these conditions being affirmative.

12. The method of claim 1, wherein at least one sensor-specific parameter of the ultrasonic sensor is measured before determining an existing misalignment of the ultrasonic sensor, wherein a malfunction of the ultrasonic sensor due to structure-borne sound is inferred in response to a deviation of the sensor-specific parameters from a standard value.

13. A distance measuring device of a transportation vehicle, the distance measuring device comprising:
a plurality of ultrasonic sensors, including at least one exterior temperature sensor;
a plurality of acceleration sensors for detecting a crash and/or a manipulation of the transportation vehicle;
at least one memory unit for storing data of the acceleration sensors and/or for storing echo images of the ultrasonic sensors;
at least one time or displacement sensor for outputting an elapsed time or distance value since switching on the ignition or since opening the transportation vehicle;
at least one comparison unit for comparing created and stored echo images and/or for comparing the time or distance value with a stored threshold value;
at least one optical and/or acoustic output unit and at least one evaluation and control device for evaluating signals of the ultrasonic sensors, for actuating the optical and/or acoustic output unit, and for actuating components which operate based on signals of the ultrasonic sensors,
wherein the evaluation and control device actuates the ultrasonic sensors, the acceleration sensors, the memory unit, the time or displacement sensor, the comparison unit, and the optical and/or acoustic output unit, to determine a misalignment of ultrasonic sensors,
wherein, in response to a determined misalignment of at least one of the ultrasonic sensors by the evaluation and control device, an optical and/or acoustic warning is issued, and components which operate based on signals of the misaligned ultrasonic sensor are actuated such that their function is deactivated or at least their functional scope is reduced.

14. A transportation vehicle including the distance measuring device of claim 13.

15. The device of claim 13, wherein the device measures whether the ultrasonic sensor continuously measures a distance in a near range, or measures distances in the near range which are highly variable over time, and in response to one of these conditions being affirmative, a misalignment of the ultrasonic sensor is inferred.

16. The device of claim 13, wherein the device measures whether a structure-borne sound signal from the ultrasonic sensor to be checked is received by at least one ultrasonic sensor which is directly adjacent to the ultrasonic sensor to be checked, and in response to this condition being negative, a misalignment of the ultrasonic sensor to be checked is inferred.

17. The device of claim 13, wherein the external temperature is measured before determining an existing misalignment of the ultrasonic sensor, and in response to an external temperature being around the freezing point, at least one sensor-specific parameter of the ultrasonic sensor is measured, wherein in response to a deviation of the sensor-specific parameter from a standard value, a malfunction of the ultrasonic sensor caused by snow or ice is inferred.

18. The device of claim 13, wherein, when approaching an object, it is checked whether the object is detected by several ultrasonic sensors of a group of ultrasonic sensors, and in response to this condition being affirmative, it is checked whether the object is not detected by an ultrasonic sensor of the group, wherein in response to this condition being affirmative, it is inferred that there is a misalignment of that ultrasonic sensor from the group which did not detect the object.

19. The device of claim 18, wherein a misalignment of the ultrasonic sensor not detecting the object is inferred only in response to the ultrasonic sensor being installed between two other ultrasonic sensors from the group, and the detection areas of the ultrasonic sensors overlap.

20. The device of claim 18, wherein a reference echo image of the underlying surface surrounding the transportation vehicle is produced by the ultrasonic sensor when shutting off the ignition, wherein a further echo image of the underlying surface surrounding the transportation vehicle is produced after restarting the ignition or after opening the transportation vehicle, and the echo image is compared with the reference echo image, wherein a misalignment of the ultrasonic sensor is inferred in response to a difference between the echo images.

21. The device of claim 19, wherein only echo signals of objects which are classified as low are taken into consideration for producing the echo images of the underlying surface surrounding the transportation vehicle.

22. The device of claim 13, wherein a cyclically check is performed to determine whether the ultrasonic sensor for misalignment was possible after switching on the ignition or after opening the transportation vehicle, wherein after exceeding a certain period of time or a certain distance after switching on the ignition, after which such a proper check of the ultrasonic sensor was not possible, an evaluation of stored values of acceleration sensors of the transportation vehicle takes place as to whether a crash or a manipulation of the transportation vehicle has taken place, wherein a misalignment which is caused by a crash or manipulation is inferred in response to one of these conditions being affirmative.

23. The device of claim 13, wherein at least one sensor-specific parameter of the ultrasonic sensor is measured before determining an existing misalignment of the ultrasonic sensor, wherein a malfunction of the ultrasonic sensor due to structure-borne sound is inferred in response to a deviation of the sensor-specific parameters from a standard value.

* * * * *